United States Patent
Joshi

(10) Patent No.: US 11,003,707 B2
(45) Date of Patent: May 11, 2021

(54) IMAGE PROCESSING IN A VIRTUAL REALITY (VR) SYSTEM

(71) Applicant: TENCENT TECHNOLOGY (SHENZHEN) COMPANY LIMITED, Shenzhen (CN)

(72) Inventor: Dhaval Jitendra Joshi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/423,383

(22) Filed: May 28, 2019

(65) Prior Publication Data

US 2019/0278797 A1    Sep. 12, 2019

Related U.S. Application Data

(63) Continuation of application No. PCT/CN2017/074358, filed on Feb. 22, 2017.

(51) Int. Cl.
*G06F 16/53* (2019.01)
*G06F 3/0482* (2013.01)
(Continued)

(52) U.S. Cl.
CPC ............ *G06F 16/53* (2019.01); *G06F 3/011* (2013.01); *G06F 3/0482* (2013.01); *G06F 3/04842* (2013.01); *G06F 3/04845* (2013.01); *G06F 3/167* (2013.01); *G06F 16/5854* (2019.01); *G06K 9/00624* (2013.01); *G06T 11/00* (2013.01); *G06K 9/00* (2013.01); *G06T 2200/24* (2013.01)

(58) Field of Classification Search
CPC ........................................................ G06F 16/53
USPC ............................................................ 715/728
See application file for complete search history.

(56) References Cited

U.S. PATENT DOCUMENTS 5,748,868 A * 5/1998 Echigo .................... G06K 7/14
345/619
9,405,126 B1 * 8/2016 Margolin ............. G03B 11/046
(Continued)

FOREIGN PATENT DOCUMENTS

CN         101843086 A      9/2010
CN         106155311 A      11/2016
(Continued)

OTHER PUBLICATIONS

The State Intellectual Property Office of the People's Republic of China (SIPO) Office Action 1 for 201780058691.2 dated Jan. 21, 2020 6 Pages (including translation).
(Continued)

*Primary Examiner* — Reza Nabi
(74) *Attorney, Agent, or Firm* — Anova Law Group, PLLC

(57) ABSTRACT

Solutions of image processing in a VR system is disclosed, including: obtaining a photographic image; identifying at least one object in the photographic image; generating at least one tag respectively for each of the at least one object; presenting the at least one tag of the photographic image through a VR User Interface (UI); confirming one or more of the at least one tag in response to receiving a confirmation user instruction from the VR UI; and associating the confirmed one or more tags with the photographic image.

18 Claims, 8 Drawing Sheets

(51) Int. Cl.
  *G06F 3/0484* (2013.01)
  *G06F 3/16* (2006.01)
  *G06K 9/00* (2006.01)
  *G06T 11/00* (2006.01)
  *G06F 16/583* (2019.01)
  *G06F 3/01* (2006.01)

(56) References Cited

U.S. PATENT DOCUMENTS

| | | | | |
|---|---|---|---|---|
| 2008/0266101 A1* | 10/2008 | Canipe | G08B 13/2448 | 340/572.3 |
| 2008/0278438 A1* | 11/2008 | Brown | G06F 3/0488 | 345/156 |
| 2008/0282177 A1* | 11/2008 | Brown | G06F 16/81 | 715/763 |
| 2009/0006484 A1* | 1/2009 | Wang | H04N 1/0044 | |
| 2009/0316961 A1* | 12/2009 | Gomez Suarez | G06K 9/033 | 382/118 |
| 2009/0324137 A1* | 12/2009 | Stallings | H04N 5/23206 | 382/306 |
| 2010/0054601 A1* | 3/2010 | Anbalagan | G06K 9/00677 | 382/180 |
| 2011/0228098 A1* | 9/2011 | Lamb | G01S 17/86 | 348/164 |
| 2011/0249144 A1* | 10/2011 | Chang | G11B 27/28 | 348/231.3 |
| 2011/0307491 A1* | 12/2011 | Fisk | G06F 16/58 | 707/741 |
| 2012/0072410 A1* | 3/2012 | Wang | G06F 16/532 | 707/711 |
| 2012/0114199 A1* | 5/2012 | Panyam | G06K 9/00288 | 382/118 |
| 2012/0151398 A1* | 6/2012 | Foy | G06F 16/5866 | 715/769 |
| 2012/0158686 A1* | 6/2012 | Hua | G06F 16/5866 | 707/706 |
| 2012/0203651 A1* | 8/2012 | Leggatt | G06F 16/958 | 705/26.3 |
| 2012/0224067 A1* | 9/2012 | Stuart | G06F 16/58 | 348/164 |
| 2012/0244886 A1* | 9/2012 | Blom | G16H 50/80 | 455/456.3 |
| 2013/0129142 A1* | 5/2013 | Miranda-Steiner | G06K 9/00664 | 382/103 |
| 2013/0166651 A1* | 6/2013 | Joshi | G06F 3/0484 | 709/204 |
| 2013/0204866 A1* | 8/2013 | Fork | G06F 16/532 | 707/723 |
| 2013/0262588 A1* | 10/2013 | Barak | G06K 9/00221 | 709/204 |
| 2013/0281208 A1* | 10/2013 | Lyons | G06K 9/00711 | 463/33 |
| 2013/0297535 A1* | 11/2013 | Joshi | G06F 16/29 | 705/400 |
| 2013/0322709 A1* | 12/2013 | Irani | G06F 21/36 | 382/124 |
| 2014/0108963 A1* | 4/2014 | Black | G06F 3/04845 | 715/753 |
| 2014/0313222 A1* | 10/2014 | Anderson | G06T 7/30 | 345/629 |
| 2014/0358679 A1* | 12/2014 | Levinson | G06Q 30/0277 | 705/14.49 |
| 2015/0066657 A1* | 3/2015 | Terrill | G06Q 30/0273 | 705/14.69 |
| 2015/0120575 A1* | 4/2015 | Joshi | G06Q 30/0257 | 705/80 |
| 2015/0127447 A1* | 5/2015 | Joshi | G06Q 30/0233 | 705/14.26 |
| 2015/0213088 A1* | 7/2015 | Joshi | H04W 4/02 | 707/722 |
| 2015/0220988 A1* | 8/2015 | Joshi | G01C 21/20 | 705/14.58 |
| 2015/0223201 A1* | 8/2015 | Joshi | H04H 20/57 | 455/3.06 |
| 2016/0170480 A1* | 6/2016 | Aonuma | G09B 5/06 | 345/8 |
| 2016/0259427 A1* | 9/2016 | Zheng | G06F 3/0221 | |
| 2016/0342624 A1* | 11/2016 | Mazur | G06F 16/5866 | |
| 2017/0103072 A1* | 4/2017 | Yuen | G06F 16/58 | |
| 2017/0262154 A1* | 9/2017 | Black | G02B 27/0093 | |
| 2017/0318219 A1* | 11/2017 | Matsuzawa | H04N 5/23219 | |
| 2017/0337736 A1* | 11/2017 | Cheng | G08B 21/24 | |
| 2018/0040212 A1* | 2/2018 | Cheng | G02B 27/0176 | |
| 2018/0152500 A1* | 5/2018 | Park | G06Q 10/10 | |
| 2018/0260584 A1* | 9/2018 | Joshi | G06F 21/36 | |
| 2019/0098005 A1* | 3/2019 | Joshi | G06F 3/0346 | |
| 2019/0243470 A1* | 8/2019 | Joshi | G06F 3/011 | |
| 2019/0272094 A1* | 9/2019 | Minsky | G06F 3/04845 | |
| 2019/0272285 A1* | 9/2019 | Minsky | G06F 16/5866 | |
| 2019/0278797 A1* | 9/2019 | Joshi | G06T 11/00 | |
| 2019/0369404 A1* | 12/2019 | Joshi | G06F 3/0481 | |
| 2020/0033941 A1* | 1/2020 | Joshi | G06F 3/012 | |
| 2020/0034995 A1* | 1/2020 | Joshi | H04W 4/20 | |
| 2020/0201434 A1* | 6/2020 | Aliamiri | G06F 3/012 | |
| 2020/0272229 A1* | 8/2020 | Sudarsky | G02B 27/017 | |

FOREIGN PATENT DOCUMENTS

| | | |
|---|---|---|
| CN | 106200973 A | 12/2016 |
| CN | 106251405 A | 12/2016 |
| CN | 106339094 A | 1/2017 |

OTHER PUBLICATIONS

The World Intellectual Property Organization (WIPO) International Search Report for PCT/CN2017/074358 dated Nov. 13, 2017 3 Pages.

* cited by examiner

IMAGE PROCESSING IN A VIRTUAL REALITY (VR) SYSTEM

CROSS REFERENCE TO RELATED APPLICATIONS

This application is a continuation application of PCT Patent Application No. PCT/CN2017/074358, filed on Feb. 22, 2017, the entire content of which is incorporated herein by reference.

BACKGROUND

Virtual reality (VR) typically refers to computer technologies that use software to simulate realistic images, sounds and other sensations that replicate a real environment (or create an imaginary setting), and simulate a user's physical presence in this environment, by enabling the user to interact with this space and any objects depicted therein using specialized display screens or projectors and other devices. VR has been defined as "a realistic and immersive simulation of a three-dimensional environment, created using interactive software and hardware, and experienced or controlled by movement of the body" or as an "immersive, interactive experience generated by a computer". A person using virtual reality equipment is typically able to "look around" the artificial world, move about in it and interact with features or items that are depicted on a screen or in goggles. Virtual realities artificially create sensory experiences, which can include sight, touch, hearing, and, less commonly, smell. Most 2016-era virtual realities are displayed either on a computer monitor, a projector screen, or with a virtual reality headset (also called head-mounted display or HMD). HMDs typically take the form of head-mounted goggles with a screen in front of the eyes. Virtual Reality brings the user into the digital world by cutting off outside stimuli. In this way user is solely focusing on the digital content.

Photospheres (or photo sphere) are 360-degree or 720-degree panoramic photos with a 3-dimension view provided in a VR system, which can be created by a professional or amateur VR camera.

SUMMARY

The present disclosure provides a method of image processing in a VR system, including: obtaining, by a computing device, a photographic image; identifying, by the computing device, at least one object in the photographic image; generating, by the computing device, at least one tag respectively for each of the at least one object; presenting, by the computing device, the at least one tag of the photographic image through a VR User Interface (UI); confirming, by the computing device, one or more of the at least one tag in response to receiving a confirmation user instruction from the VR UI; and associating, by the computing device, the confirmed one or more tags with the photographic image.

The present disclosure further provides a method of image processing in a VR system, including: receiving from a client a user identifier, an image identifier of a photographic image, and one or more tags; wherein the client analyzes the photographic image through an image recognition algorithm to identify at least one object in the photographic image and generate at least one tag respectively for each of the at least one object, and confirms the one or more tags from the at least one tag; and associating the image identifier with the user identifier to associate the photographic image with the user identifier; associating the one or more tags with the image identifier and the user identifier; in response to receiving from the client an opening request including the user identifier and the image identifier, determining the photographic image according to the image identifier, and sending the determined photographic image to the client.

The present disclosure further provides a terminal device in a VR system, including: a processor; a memory; and instructions stored in the memory and executable by the processor; wherein the instructions include: obtaining a photographic image; identifying at least one object in the photographic image; generating at least one tag respectively for each of the at least one object; presenting the at least one tag of the photographic image through a VR User Interface (UI); confirming one or more of the at least one tag in response to receiving a confirmation user instruction from the VR UI; and associating the confirmed one or more tags with the photographic image.

The present disclosure further provides a server device in a Virtual Reality (VR) system, including: a processor; a memory; and instructions stored in the memory and executable by the processor; wherein the instructions include: receiving from a client a user identifier, an image identifier of a photographic image, and one or more tags; wherein the client analyzes the photographic image through an image recognition algorithm to identify at least one object in the photographic image and generate at least one tag respectively for each of the at least one object, and confirms the one or more tags from the at least one tag; and associating the image identifier with the user identifier to associate the photographic image with the user identifier; associating the one or more tags with the image identifier and the user identifier; in response to receiving from the client an opening request including the user identifier and the image identifier, determining the photographic image according to the image identifier, and sending the determined photographic image to the client.

The present disclosure also provides a non-transitory machine-readable storage medium, storing instructions to cause a machine to execute any of the above mentioned methods.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Figure 1:
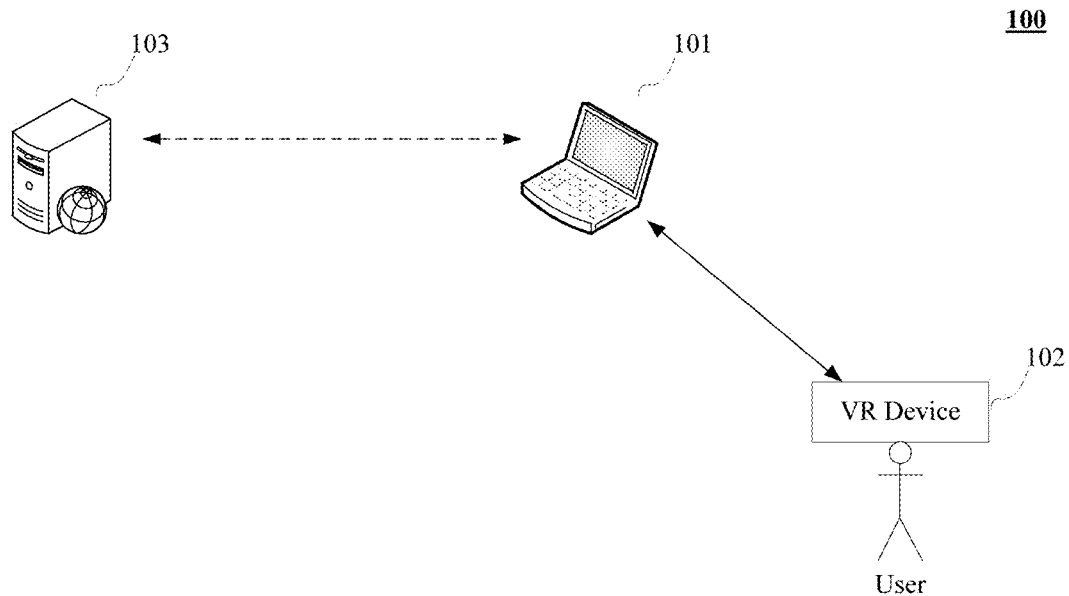
FIG. 1 is a schematic diagram illustrating a VR system in accordance with an example of the present disclosure.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various examples given in this specification.

Reference throughout this specification to "one example," "an example," "specific example," or the like in the singular or plural means that one or more particular features, structures, or characteristics described in connection with an example is included in at least one example of the present disclosure. Thus, the appearances of the phrases "in one example" or "in an example," "in a specific example," or the like in the singular or plural in various places throughout this specification are not necessarily all referring to the same example. Furthermore, the particular features, structures, or characteristics may be combined in any suitable manner in one or more examples.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the various examples in conjunction with the accompanying drawings in FIGS. 1~7. It should be understood that specific examples described herein are merely intended to explain the present disclosure, but not intended to limit the present disclosure. In accordance with the purposes of this disclosure, as embodied and broadly described herein, this disclosure, in one aspect, relates to method, apparatus and system of image processing in a VR system which may be applied to a user terminal and/or a server.

The present disclosure provides some examples for processing images in a VR system. FIG. 1 shows a VR system 100 capable of presenting a photographic image to a user. In an example, the VR system 100 may include a terminal device 101 running a VR client and a VR device 102 operated and worn and/or hold by a user. The terminal device 101 stores the photographic image in local, and presents (e.g., displays) the photographic image via the VR client through a VR User Interface (UI), so that the user is able to browse the photographic image through the VR UI via the VR device 102. In another example, the VR system 100 may further include a server device 103 running a VR server. The server device 103 stores the photographic image. The terminal device 101 obtains the photographic image from the server device 103 and presents the photographic image via the VR client through the VR UI.

In an example, the VR device 102 may include a pair of VR glasses or a VR headset (also called a head-mounted display or HMD), and the user can emerge in the virtual reality environment through the VR glasses or the head-mounted display. The VR device 102 may also work with a VR compatible controller or pointer which can be operated by the user, and the user is able to send a user instruction to the VR client at the terminal device 101 through operating the controller or pointer, such as holding the controller or pointer and pointing to an object in the image presented by the VR client, or pressing a button on the controller or pointer to activate a function of the VR client, or etc. Besides, the user is able to send a user instruction to the VR client through the use of standard input devices such as a keyboard and mouse connected with the terminal device 101. In an example, the photographic image presented in the VR system may be various types of digital photos, including a 2-dimension photo, a panorama photo and/or a 3-dimension photo which also called a photosphere, a 360-degree or 720-degree photo or the like.

Examples of the terminal device 101 that can be used in accordance with various examples include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a PC or laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to one skilled in the art.

User-generated contents, such as 360-degree photos, will be the key contents for rising acceptance of the VR system. One fundamental problem with the photos is that they are hard to organize. The VR system will face this problem at a much bigger scale due to limitations of interaction models. In most cases, users need to use controllers and pointers to browse and experience the photos, however, they cannot simply use a mouse or touchscreen to handle them. The only way to find a photo in an album is through sequentially browsing a plurality of photos. Also the interaction in the VR system is pretty linear for now (there is no equivalent of multi-touch in the VR system). This means a user has to look at a plurality of thumbnails to identify if this is the photo he is interested in. This makes organizing photos a big challenge. As the size of an album grows, such problem will intensify.

Figure 2:
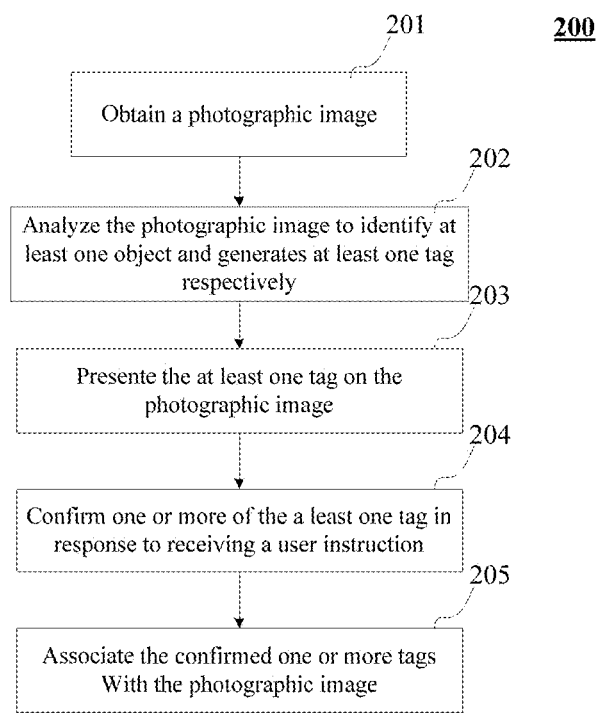
FIG. 2 is a schematic diagram illustrating a flow chart of image processing in accordance with an example of the present disclosure.

The present disclosure provides a method of image processing in the VR system to solve the above problem. The method may be applied to the VR client running on the terminal device 101. As shown in FIG. 2, the method includes the following processes 200:

At Block 201, the VR client on the terminal device 101 obtains a photographic image.

Figure 3A:
FIGS. 3A-3G are illustrative diagrams showing User Interfaces in accordance with an example of the present disclosure.

In an example, the VR client obtains the photographic image stored in the terminal device 101 locally, or obtains the photographic image from the VR server on the server device 103 which is stored in the server device 103. As mentioned above, the photographic image may be various types of digital photos, such as a 2-dimension photo, a panorama photo and/or a 3-dimension photo which also called a photosphere, a 360-degree or 720-degree photo or the like. As shown in FIG. 3A, a 360-degree photo is obtained and displayed by the VR client on a VR IU.

At Block 202, the VR client analyzes the photographic image through an image recognition algorithm to identify at least one object in the photographic image and generates at least one tag respectively for each of the at least one object.

In an example, an image recognition module loading one or more image recognition algorithms may be added to the VR client, the VR client can invoke the image recognition module to implement the process at Block 202.

At Block 203, the VR client presents the at least one tag of the photographic image through a VR User Interface (UI).

Figure 3B:
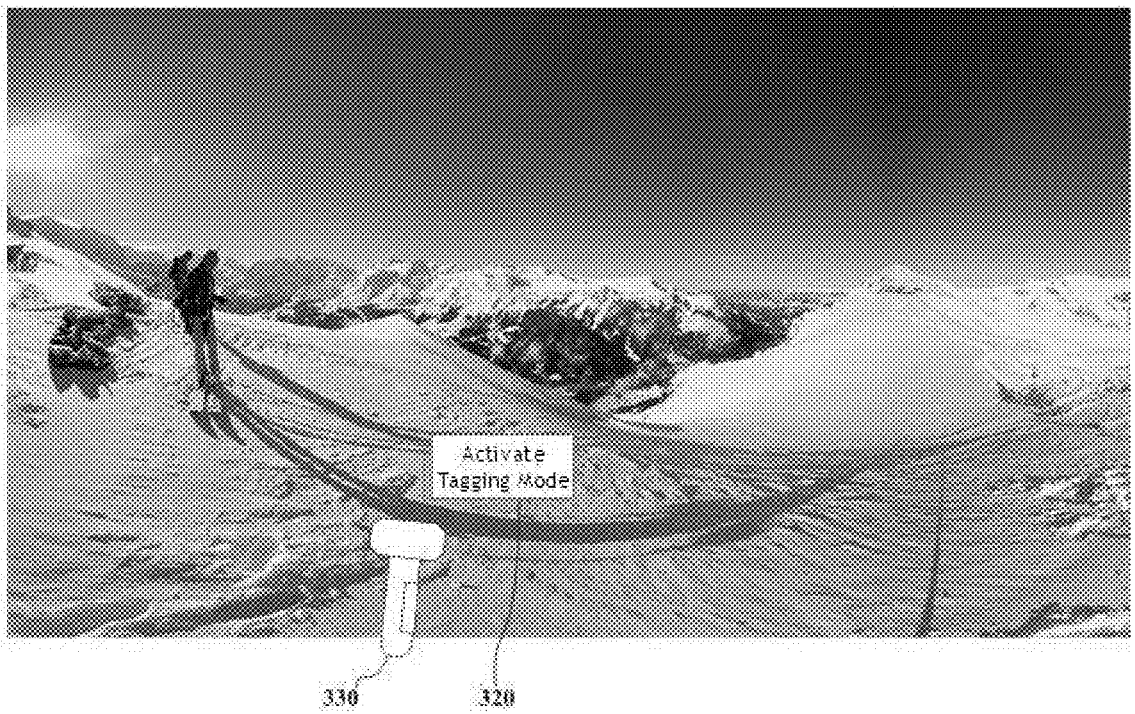
Figure 3C:
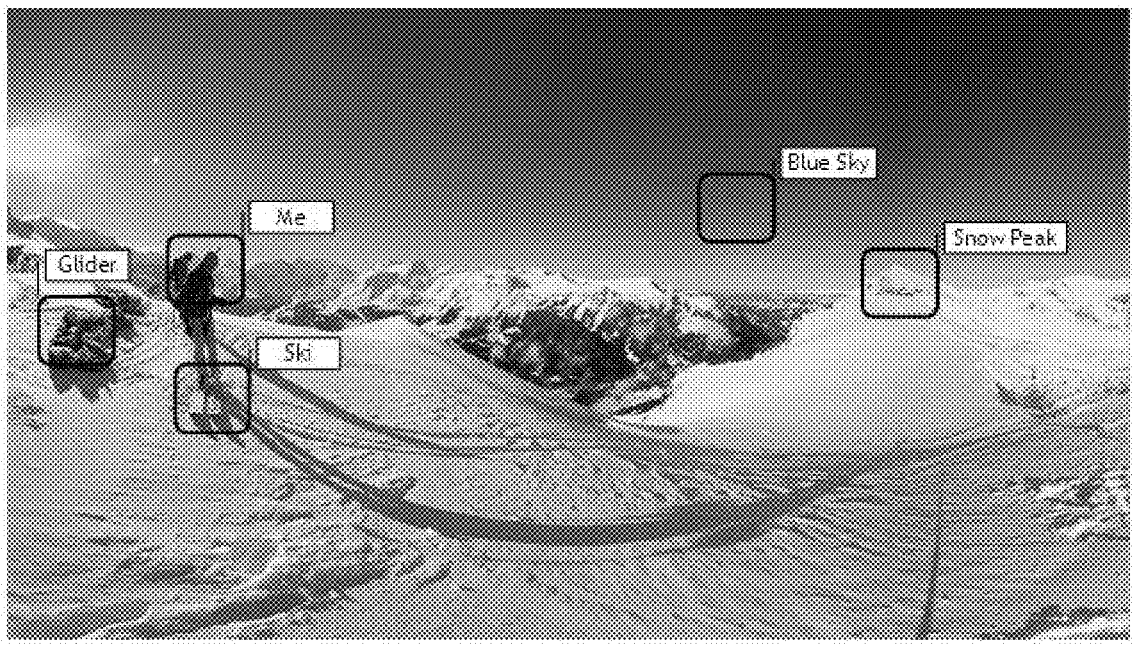

In an example, a plurality of tags "Glider", "Me", "Ski", "Blue Sky" and "Snow Peak" are generated for a plurality of objects marked by the rectangles and displayed on a photosphere as shown in FIG. 3C.

At Block 204, the VR client confirms one or more of the at least one tag in response to receiving a user instruction from the VR UI.

Figure 3D:
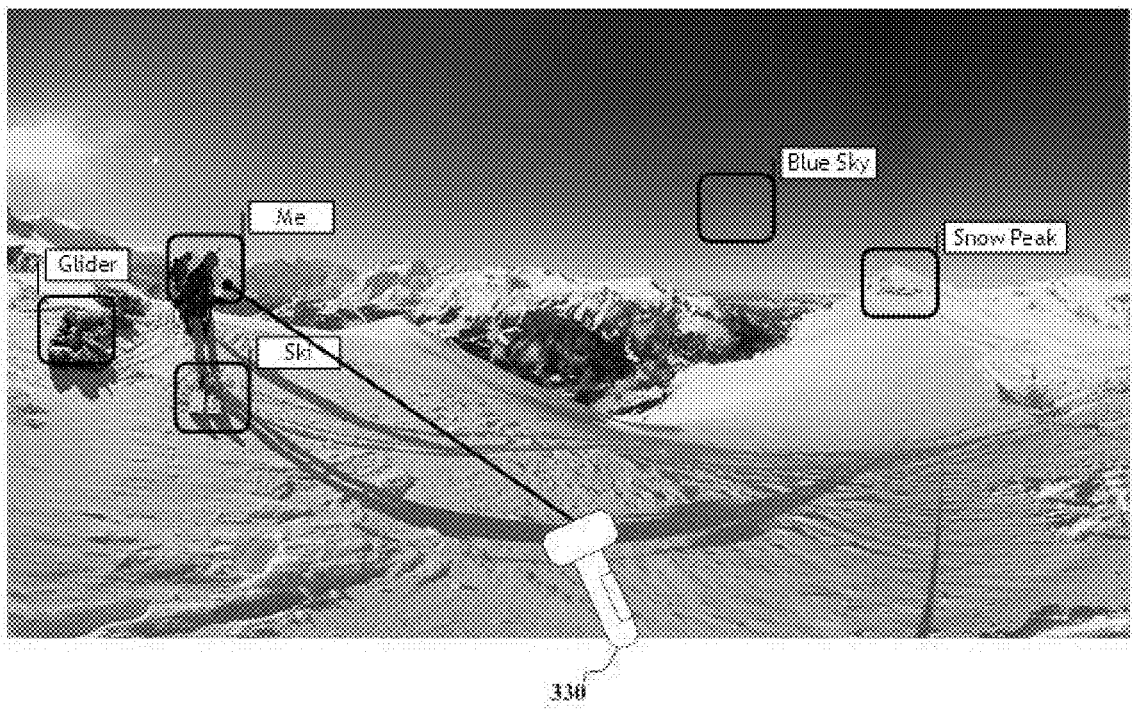

In an example, when the VR client displays the photographic image, the at least one tag is attached on the photographic image, so that the VR client can suggest the at least one tag at Block 203. Then, at Block 204, upon receiving a user instruction, the VR client can determine one or more of the suggested tag that are confirmed by the user according the user instruction. In an example, when the user uses a controller or pointer to point to a tag displayed on the photographic image, the VR client will receive a user instruction (e.g., activation instruction) indicating that the user selects (or activates) the tag to which the controller or pointer points, and then the VR client confirms this tag selected by the user. As shown in FIG. 3D, the user uses a pointer 330 to point inside a rectangular indicating a person object corresponding to a tag "Me", and the VR client will determine that this tag "Me" is correct and confirm this tag "Me". In another example, when the user uses a controller or pointer to point to a tag displayed on the photographic image, the VR client will receive a user instruction indicating that the user wants to operate the tag to which the controller or pointer points, then the VR client presents one or more options for the tag on the photographic image, and when the user uses the controller or pointer to point to the option of confirmation, the VR client will receive a user instruction indicating that the user selects (or activates) this tag, and then the VR client confirms this tag selected by the user.

At Block 205, the VR client associates the confirmed one or more tags with the photographic image.

In an example, the VR client associates the one or more tags with the photographic image stored in local. In another example, the photographic image is stored in the server device 103, the VR client sends the one or more tags and related information of the photographic image to the VR server on the server device 103, so that the VR server can associate the one or more tags with the photographic image.

In the above solution provided in the above examples, one or more tags can be created for the photographic image, so that the photographic image in the VR system can be organized based on the tag(s) easily. As the photographic image can be associated with one or more tags, it is possible to search and sort the photographic image based on the one or more tags. It will be much easier for the user to find a desired photographic image in the VR system, and thus processing efficiency will be raised, processing resources will be saved, and performance of the VR system will be improved. And the tags can be used as a filter, search and discovery mechanism to find the relevant photographic image in a VR environment.

In an example, at Block 202, before analyzing the photographic image, the method further includes a process of the VR client presenting the photographic image with a UI control for activating a tag service through the VR UI, and activating the tag service in response to receiving a user instruction (e.g., activation instruction) on the UI control. Upon the tag service being activated, the VR client performs the process of analyzing the photographic image is performed. In an example, as shown in FIG. 3B, a UI control 320 is presented on the photosphere, the user uses a controller or pointer 330 to point to the UI control 320 and press (e.g., long press) the UI control 320, then the VR client receives a user instruction on the UI control 320 indicating that the user is to activate the tag service, and the VR client activates the tag service in response to this user instruction.

Herein, the tag service may be a module in the VR client, capable of implementing functions for tagging the photographic image which may include any or any combination of the processes of Blocks 202~205. The VR client may invoke the module of the tag service to implement the functions for tagging the photographic image.

In an example, at Block 203, before presenting the at least one tag of the photographic image, the VR client may further determine where the at least one tag is to be present. The VR client may further perform a process of determining a pixel location of each of the at least one tag in the photographic image, and then the at least one tag is presented at the determined pixel location.

In an example, the pixel location of the tag is determined according to that of the at least one object, and the pixel location of the tag is surrounding that of any of the at least one object. Herein, the pixel location of the tag may be a random pixel location surrounding that of the at least one object. In another example, the pixel location of the tag is determined according to that of the corresponding object, and the pixel location of the tag is near that of the corresponding object. Herein, the pixel location of each tag is near or adjacent to its corresponding object, so that the user can easily identify various objects' respective tags. As shown in FIG. 3C, each tag is present near its corresponding object in the photosphere.

Figure 3E:
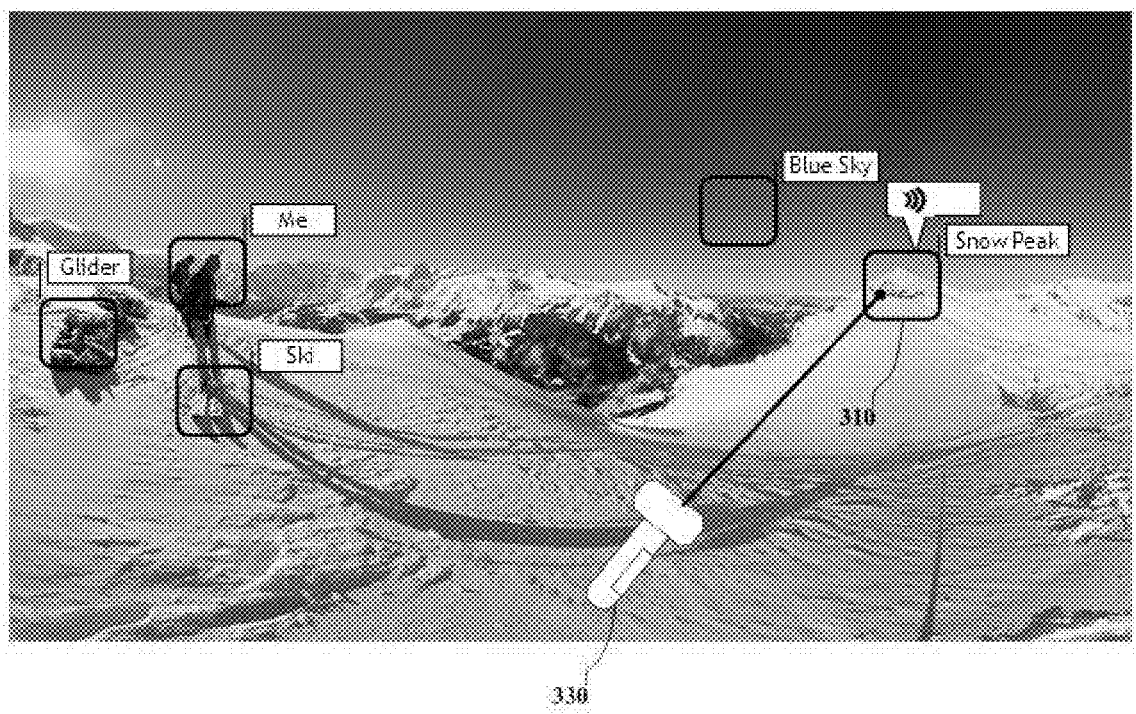

In an example, at Block 203, the VR client may further presenting a link between any of the at least one tag and the corresponding object on the photographic image through the VR UI. Thus, the user can easily identify which object a tag corresponds to. In addition, the VR client presents in the photographic image a symbol, a line or a polygon of any shape (e.g., a circle or a rectangle) or the like on any of the at least one object in order to mark the object, e.g., as shown in FIG. 3C~3E, each object is marked by a rectangle.

In an example, at Block 204, the VR client confirms any of the at least one tag in response to receiving a first user instruction on the tag. For example, when the user uses a controller or pointer to point at a pixel location on the photosphere, a tag is displayed on the photographic image, the VR client will receive a user instruction indicating that the user selects (or activates) the tag to which the controller or pointer points, and then the VR client confirms this tag selected by the user. And for another example, when the user uses a controller or pointer to point to a tag displayed on the photographic image, the VR client will receive a user instruction indicating that the user wants to operate the tag, and then the VR client presents one or more options for the tag on the photographic image. Here, the VR client may present various options for the tag including options for editing, deleting, and/or confirming the tag and etc. When the user uses the controller or pointer to point to the option of confirmation (i.e., a UI control for confirmation) among the one or more options, the VR client will receive a user instruction indicating that the user confirms to select (i.e., activate) this tag, and then the VR client confirms this tag.

In an example, at Block 204, the VR client confirms one or more tags currently presented on the photographic image in response to receiving a user instruction on a UI control for confirmation presented on the photographic image. For example, the VR client presents a UI control (e.g., a button) on the photographic image, when the user uses a controller or pointer to point to the UI control, the VR client will confirm all the tags currently presented on the photographic image.

In an example, at Block 204, before confirming a tag, the VR client may further edit the tag according to information inputted by a user in response to receiving a second user instruction on the tag.

In an example, at Block 204, before confirming a tag, the VR client may further delete the tag in response to receiving a third user instruction on the tag.

In an example, at Block 204, the VR client may further add a tag for an object according to information inputted by a user in response to receiving a fourth user instruction on the object. For example, when the user uses a controller or pointer to point to an object in the photographic image which may an object identified automatically through image recognition or any other one designated by the user, the VR client will receive a user instruction indicating that the user wants to add a tag for the object, then the VR client presents a tag icon with no content for the object on the photographic image, and the VR client adds a new tag for the object according to the information inputted to the tag icon by the user. Here, the information inputted may be in a format of text, picture or voice. As shown in FIG. 3E, the user uses a controller or pointer 330 to point to an object 310 and adds a new voice tag for the object 310. For another example, when the user uses a controller or pointer to point to a tag of an object in the photographic image, the VR client will receive a user instruction indicating that the user wants to operate the tag for the object, then the VR client presents various options for the tag including options for editing, deleting, and/or confirming the tag and adding a new tag for the object. When the user uses the controller or pointer to point to the option for adding a new tag for the object among the one or more options, the VR client will receive a user instruction indicating that the user is to add a new tag for the object, then the VR client presents a tag icon with no content for the object on the photographic image, and the VR client adds a new tag for the object according to the information inputted to the tag icon by the user.

In an example, the VR client adds a new tag for the object according to the information inputted by the user through the following processes: recording voice data inputted by the user, generating a tag including the recorded voice data for the object, and presenting the generated tag on the photographic image. Upon receiving a user instruction on the tag including the voice data (e.g., the user uses a pointer to point to such tag, or point to and press this tag), the VR client will output the voice data included in the tag through a speaker. In an example, when the user uses a controller or pointer to point to a tag icon of a new tag and press the tag icon, the VR client will receive a user instruction indicating that the user wants to input voice data to the tag icon, then the VR client starts to record the voice data inputted by the user, and generates a new tag including the voice data. In this example, it is very convenient for the user to add a new tag in VR environment. Through easily pointing to an object and a tag icon using the controller or pointer and then speaking, a new tag including voice data (also called a voice tag) can be created for the object. User operation involved herein is not complex and operation efficiency is quite high.

In an example, at Block 205, the VR client associates the confirmed one or more tags for the photographic image through the following processes: determining a pixel location of each of the one or more tags in the photographic image, and associating the determined pixel location and the one or more tags with an image identifier of the photographic image and a user identifier of a current user. Here, when a user uses a VR client, he has logged in the VR client through a user identifier. In this example, the VR client may associate the current user identifier with the image identifier, and associate the one or more tags and their respective pixel locations with the image identifier and the user identifier. Thus, when next time the user opening the photographic image, the one or more tags can be presented at the same locations in the photographic image, and this will also save the time and processing resources for presenting the one or more tags next time. Here, the pixel location in the photographic image is to locate a pixel point of the photographic image in VR environment.

In an example, the VR client determines a pixel location of the tag by the following processes: in response to receiving a user instruction (e.g., a confirmation instruction) pointing to the tag for confirming the tag, determining a pixel location where the user instruction is pointing, and taking the determined pixel location as the pixel location of the tag. Here, when a user uses a controller or pointer to point to a tag to make a confirmation, the VR client may record the pixel location where the user points, and take this pointed pixel location as the tag's pixel location. For example, an object may be identified and presented in the photographic image as a rectangular (e.g., as shown in FIG. 3D), a tag generated corresponding to the object may be a label presented near the object rectangular. The user may use the controller or pointer to point to a pixel within the object rectangular or a pixel within an area occupied by the tag label. The VR client may associate the pointed position as the tag's pixel location. In one embodiment, when the photographic image is presented again on the VR UI, the tag label may use the pointed position as the center. In another embodiment, the tag label may be kept at the previous location as long as the user pointed within the area of the object or the tag.

In an example, the VR client further uploads to the VR server at the server device 103 the user identifier, the image identifier and associated tags. In an example, the VR client further performs the following processes: sending to the VR server an opening request including the user identifier and the image identifier, receiving from the VR server the photographic image which is determined by the VR server according to the image identifier as well as each tag which is determined by the VR server according to the user identifier and the image identifier, presenting the received photographic image, and in response to a user instruction (e.g., a display instruction) for presenting tags, presenting each received tag on the photographic image.

In an example, the VR client further uploads to the VR server the pixel location of each tag associated with the image identifier and the user identifier. And then, when the VR client sends the opening request to the VR server, the VR client may further receive from the VR server the pixel location of each tag, and when presenting each tag on the photographic image, the tag can be present at its corresponding pixel location.

In some cases, the photographic image is stored in the server device 103, so that when the user uses a different terminal device to access the photographic image, the photographic image can be downloaded from the server device 103, and the tags can also be obtained from the server device 103. Therefore, the user can access the photographic image with tags everywhere. The VR client may further uploads to the VR server the pixel location of each of the associated tags, therefore, when the VR client downloads the photographic image with the tags, the pixel locations of the tags can be obtained from the VR server, and the tags can be presented at the pixel locations in the photographic image. Thus, processing efficiency of presenting the tags can be raised, and the user's experience can also be improved.

Figure 3F:
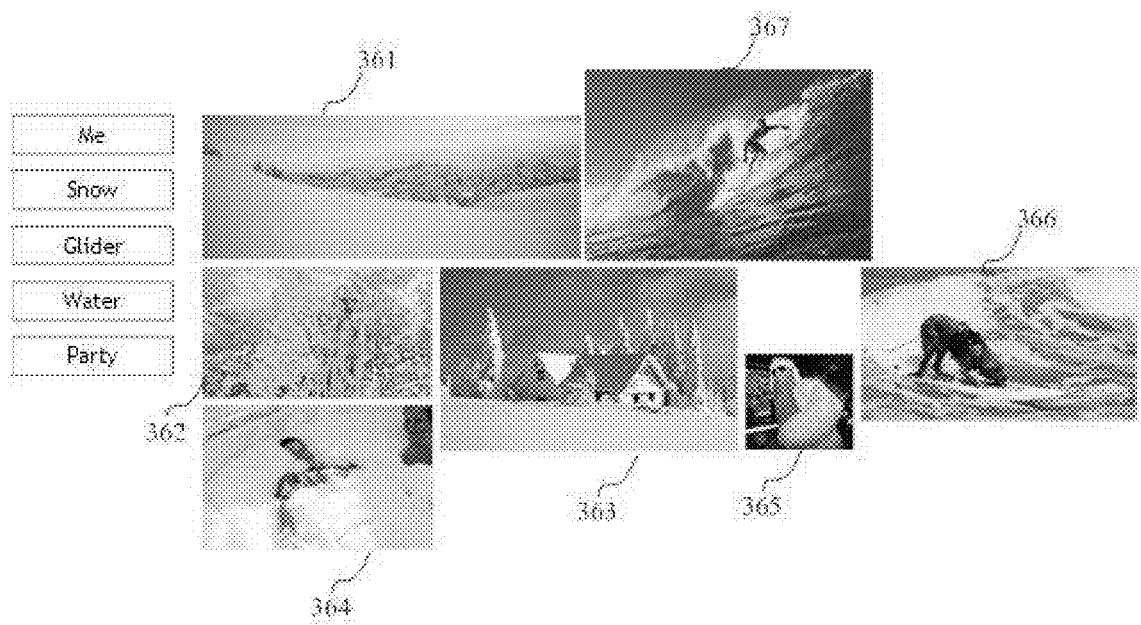
Figure 3G:
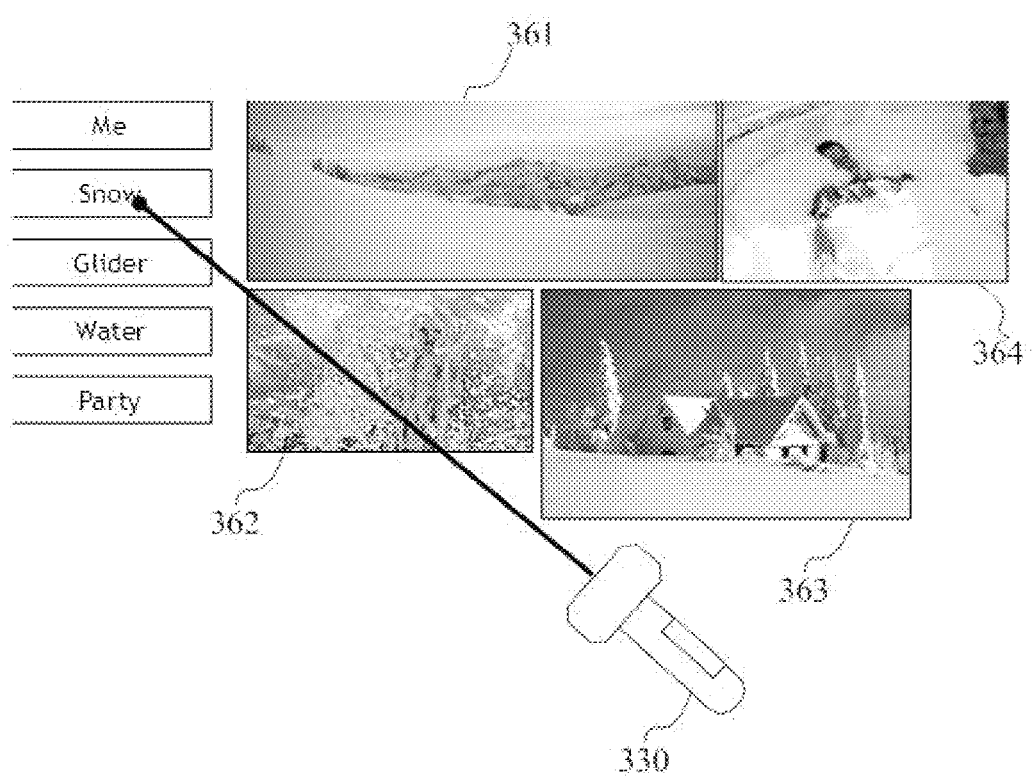

In an example, the VR client further performs the following processes:
sending to the VR server a browse request including the user identifier;
receiving from the VR server a set of tags associated with the user identifier and a set of thumbnail images of photographic images associated with the user identifier, and presenting the set of tags and the set of thumbnail images (as shown in FIG. 3F, multiple tags "Me", "Snow", "Glider", "Water" and "Party" as well as multiple thumbnail images 361~367 are listed in the VR UI); (e.g., thumbnail images may be a size-reduced image of the whole image or a cropped image just showing an area surrounding the tagged portion of the image)
in response to a user instruction of selecting any of the set of tags (as shown in FIG. 3G, the user uses a controller or pointer 330 to select the tag "Snow"), presenting one or more thumbnail images of one or more photographic images associated with the selected tag (as shown in FIG. 3G, multiple thumbnail images 361~364 associated with the tag "Snow" are listed in the VR UI);
in response to a user instruction of selecting any of the presented one or more thumbnail images, sending to the VR server an opening request including an image identifier of the selected thumbnail image;
receiving from the VR server the photographic image which is determined by the VR server according to the image identifier; and
presenting the received photographic image.

In an example, the user uses a controller or pointer to point to a tag presented in the VR UI, so that the tag is selected, and the thumbnail images of one or more photographic images associated with the selected tag are listed in the VR UI. In another example, the user inputs voice data through a microphone, then the VR client obtains a corresponding text through voice recognition, and determines the tag matched with the corresponding text as the tag selected by the user. It can be seen that the operation of selecting a tag is very simple, and thus the user's experience can be improved.

In the above example, a plurality of photographic images can be searched and sorted based on the tags. These tags will act as filters when searching for photographic images in VR environment. Thus, photographic image organization will become much easier and more scalable, and processing efficiency will be raised, processing resources will be saved, and performance of the VR system will be improved.

Figure 4:
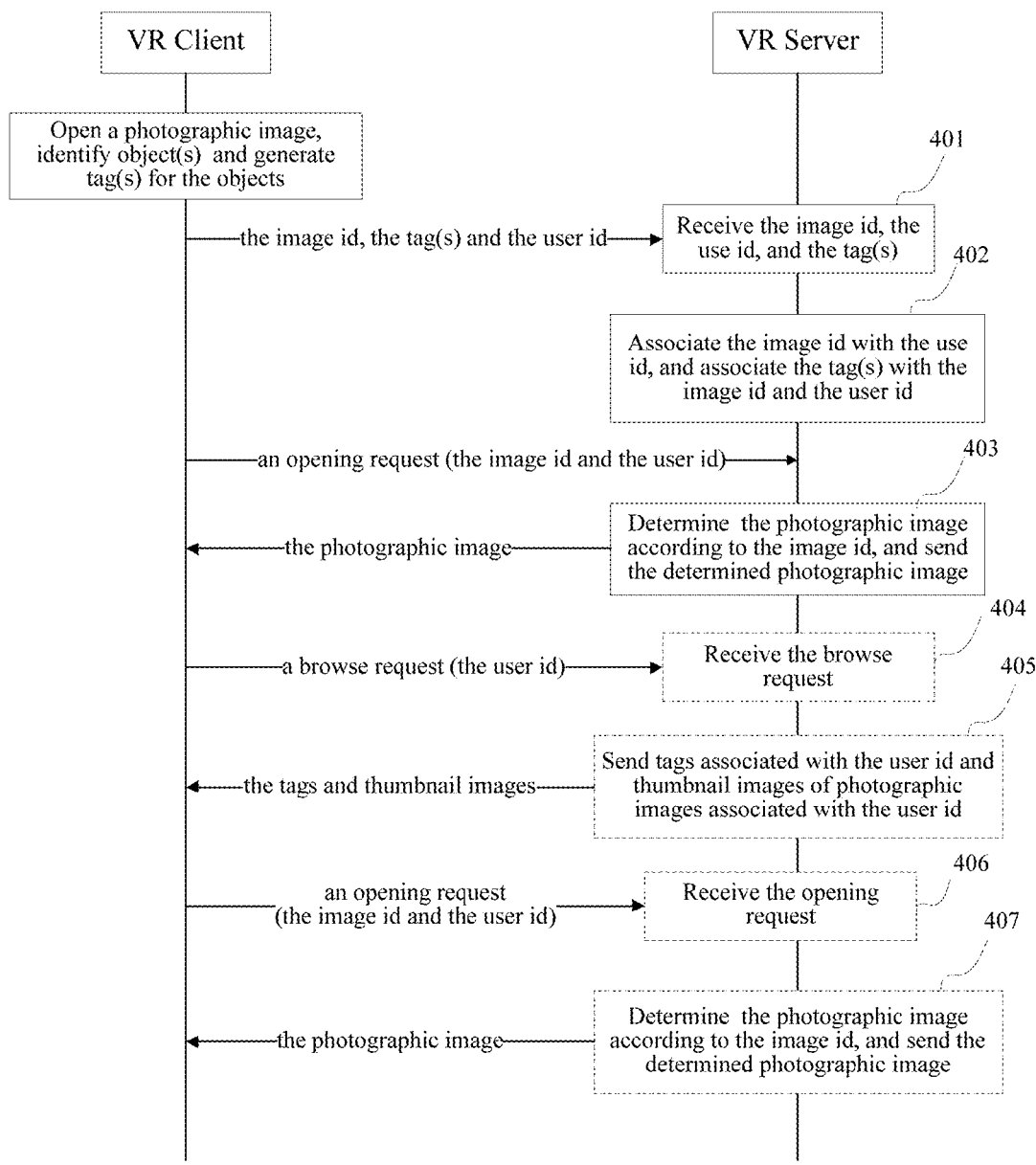
FIG. 4 is a schematic diagram illustrating a process of a flow chart of image processing in accordance with an example of the present disclosure.

According to the above examples, the present disclosure further provides a method of image processing in the VR system, which may be applied to a VR server at the server device 103. As shown in FIG. 4, the method includes the following processes 400:

At Block 401, the VR server receives from a VR client at the terminal device 101 a user identifier, an image identifier of a photographic image, and one or more tags. Here, the VR client analyzes the photographic image through an image recognition algorithm to identify at least one object in the photographic image and generate at least one tag respectively for each of the at least one object, and confirms the one or more tags from the at least one tag.

At Block 402, the VR server associates the image identifier with the user identifier to associate the photographic image with the user identifier, and associates the one or more tags with the image identifier and the user identifier.

At Block 403, the VR server, in response to receiving from the VR client an opening request including the user identifier and the image identifier, determines the photographic image according to the image identifier, and sends the determined photographic image.

In this example, the VR server obtains the tag(s) of the photographic image generated by the VR client, and associates the tag(s) with the photographic image and the current user, so that the VR server is able to organize the photographic images based on the tags and provide the photographic image with the tag(s) for the user no matter which terminal device the user is using. Thus, it is very convenient for the user to browse or search the photographic image, and it becomes much easier for the VR server to manage the photographic images.

In an example, at Block 403, the VR server further determines the one or more tags associated with the user identifier and the image identifier and sends the one or more tags to the VR client. Thus, the user of the VR client is able to open a photographic image with tag(s) wherever he is and no matter which terminal device he is using. In an example, at Block 401, the VR server further receives from the VR client a pixel location of each of the one or more tags from the client, at Block 402, further associates the pixel location of each of the one or more tags with the user identifier and the image identifier, and at Block 403, in response to receiving the opening request, further determines the pixel location of each of the one or more tags, and sends the determined pixel location of each of the one or more tags to the VR client. Thus, based on the pixel location of each tag, the tag can be presented in at the pixel location in the photographic image.

In an example, the VR server further performs the following processes:
 receiving from the VR client a browse request including the user identifier at Block 404;
 sending to the VR client a set of tags associated with the user identifier and a set of thumbnail images of photographic images associated with the user identifier at Block 405;
 receiving from the VR client an opening request including an image identifier of a thumbnail image selected by a user and a user identifier of the user at Block 406;
 determining the photographic image according to the image identifier of the thumbnail image at Block 407; and
 sending to the VR client the determined photographic image at Block 407.

It can be seen that a plurality of photographic images can be searched and sorted based on the tags. These tags will act as filters when searching for photographic images in VR environment. Thus, photographic image organization will become much easier and more scalable, and processing efficiency will be raised, processing resources will be saved, and performance of the VR system will be improved.

In an example, at Block 407, the VR server further determines the one or more tags associated with the user identifier and the image identifier and sends the one or more tags to the VR client. In an example, at Block 407, the VR server, in response to receiving the opening request, further determines the pixel location of each of the one or more tags, and sends the determined pixel location of each of the one or more tags to the VR client.

Figure 5:
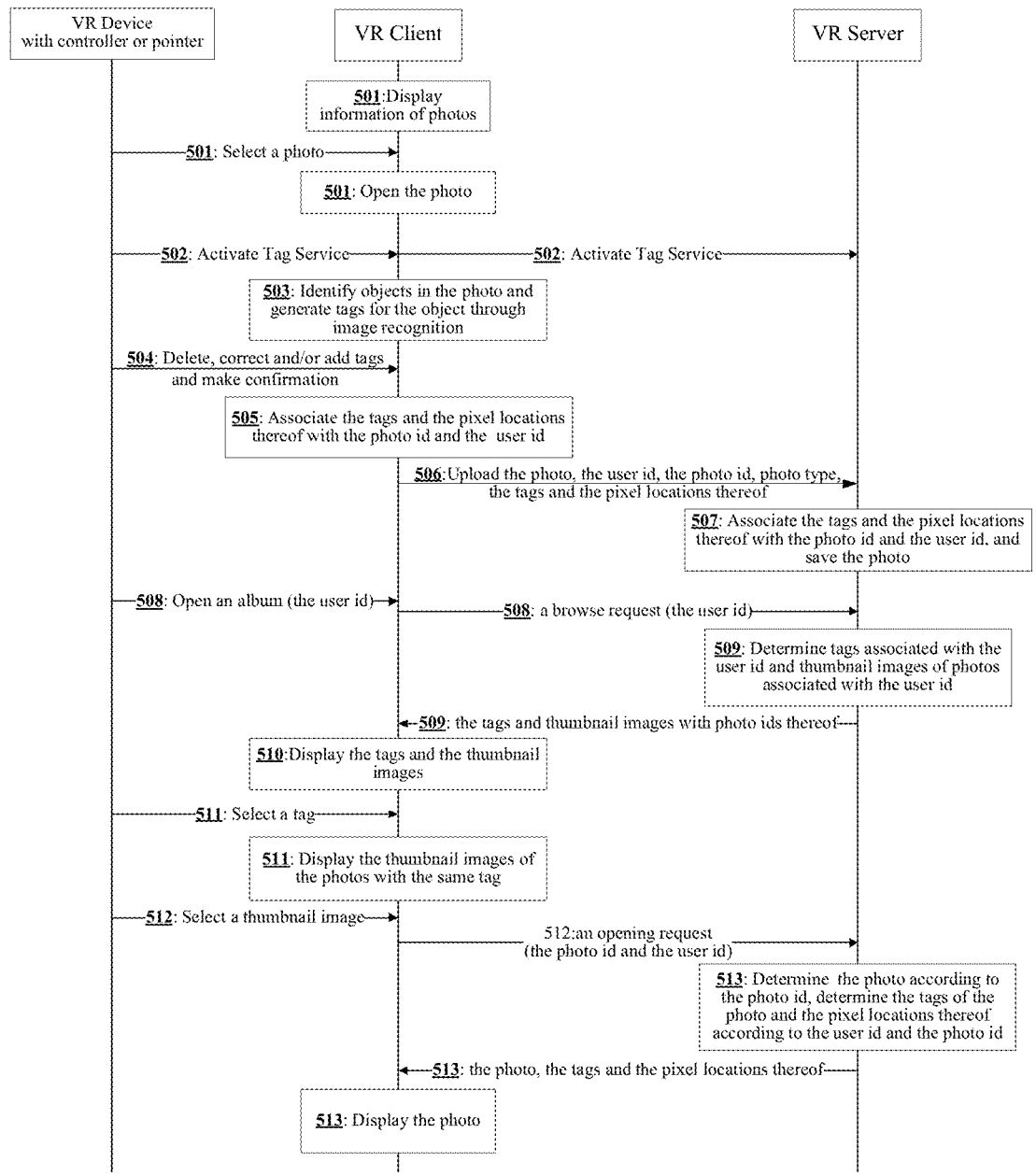
FIG. 5 is a flow diagram illustrating interactions between the VR client and VR server provided in an example of the present disclosure.

FIG. 5 shows an example of interactions between the VR client and VR server. As shown in FIG. 5, the interactions include the following processes 500:

At Process 501, the VR client displays information of photos, e.g., displays identifiers or thumbnail images of the photos. According to the information of the photos, a user uses the VR device coupled with the controller or pointer to select a photo. In response to the user's selection, the VR client opens the photo and displays the photo.

At Process 502, the user uses the controller or pointer to activate a tag service provided by the VR client and the VR server. Here, the user may hold the controller or pointer and point to a UI control for activating the tag service which is display on the photo, and press the UI control to trigger the activation of the tag service.

At Process 503, upon activation of the tag service, the VR client analyzes the photo to identify objects in the photo and generate tags for the objects through image recognition. The, the VR client displays the generated tags on the photo, and may further mark the objects in the photo.

At Process 504, the user uses the controller or pointer to issue one or more instructions to one or more tags that the VR client displays on the photo to operate the tag(s), including deleting, correcting, and/or confirming a tag, and/or adding a new tag for an object (e.g., adding a new voice tag).

At Process 505, upon confirmation of the tags, the VR client associates the tags and the pixel locations thereof with the photo identifier and the user identifier.

At Process 506, the VR client uploads to the VR server the photo, the user id, the photo id, a photo type, the tags and the pixel locations thereof. Here, the photo type represents the format of the photo, e.g., a 2-dimension photo, a 3-dimension photo, a 360-degree photo, a 720-degree photo, or a panorama photo.

At Process 507, the VR server associates the tags and the pixel locations thereof with the photo identifier and the user identifier, and saves the photo.

At Process 508, the user uses the controller or pointer to issue a request of opening an album of the user which carries the user identifier to the VR client. The VR client then sends a browse request including the user identifier to the VR server.

At Process 509, the VR server, in response to the browse request, determines (all or a part of) tags associated with the user identifier and thumbnail images of (all or a part of) photos associates with the user identifier, and returns the determined tags and thumbnail images with photo identifiers thereof to the VR client.

At Process 510, the VR client displays the received tags and thumbnail images.

At Process 511, the user uses the controller or pointer to select a tag among the displayed tags. Upon selection of the tag, the VR client displays the thumbnail images of the photos associated with the selected tag.

At Process 512, the user uses a controller or pointer to select a thumbnail image among the displayed thumbnail images. And then, the VR client sends an opening request carrying the photo identifier of the selected thumbnail image and the user identifier to the VR server.

At Process 513, the VR server, in response to the opening request, determines the photo according the photo identifier of the selected thumbnail image, and determines the tags of the photo and pixel locations thereof according to the user identifier and the photo identifier of the selected thumbnail image. Then, the VR server returns the determined photo, tags and the pixel location thereof to the VR client, and the VR client displays this photo and may further display the tags at the pixel locations thereof. Here, the identifier of a photo can be determined according to that of its thumbnail image, so that the tags of the photo can be determined according to the photo identifier of the selected thumbnail image.

It can be seen from the above example, the user can conveniently use the VR device coupled with the controller or pointer to create tags for a photo in VR environment, and can easily search and sort a photo based on the tags. The organization of photos becomes much simpler. Thus, operating efficiency is quite high, performance of the VR system is improved, and the user can obtain a much better experience when browsing photos in the VR environment.

Figure 6:
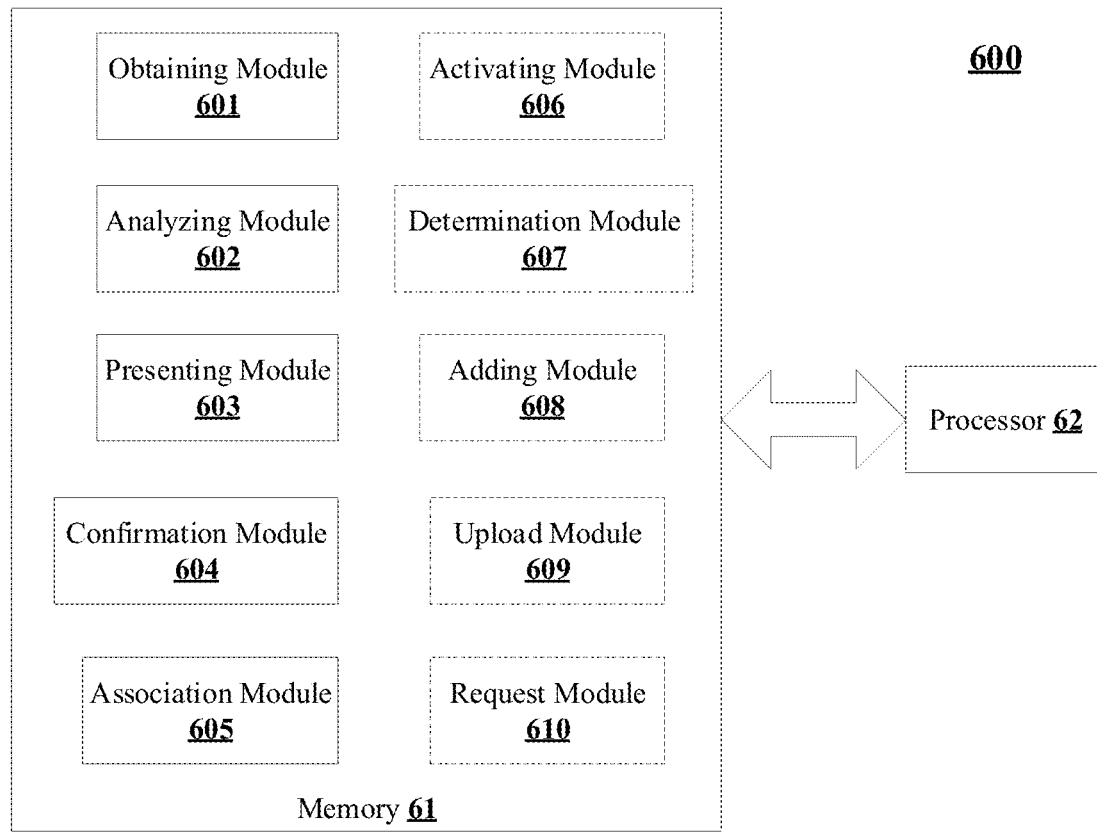
FIG. 6 is an illustrative diagram showing a terminal device provided in an example of the present disclosure.

Based on the above examples, the present disclosure further provides a terminal device in the VR system. As shown in FIG. 6, the terminal device 600 includes a VR client which includes the following modules:

Obtaining module 601 is capable of obtaining a photographic image.

Analyzing module 602 is capable of analyzing the photographic image through an image recognition algorithm to identify at least one object in the photographic image and generate at least one tag respectively for each of the at least one object.

Presenting module 603 is capable of presenting the at least one tag of the photographic image through a VR UI.

Confirmation module 604 is capable of confirming one or more of the at least one tag in response to receiving a user instruction from the VR UI.

Association module 605 is capable of associating the confirmed one or more tags with the photographic image.

In an example, before analyzing the photographic image, the analyzing module 602 further presents the photographic image with a UI control for activating a tag service through the VR UI. The terminal device 600 further includes an activating module 606 capable of activating the tag service in response to receiving a user instruction on the UI control. The analyzing module 602 analyzes the photographic image upon the tag service being activated.

In an example, the terminal device 600 further includes a determination module 607 capable of determining a pixel location of each of the at least one tag in the photographic image. The presenting module 603 presents the at least one tag at the determined pixel location on the photographic image.

In an example, the terminal device 600 further includes an adding module 608 capable of, in response to receiving a user instruction (e.g., a tagging user instruction) to any of the at least one object, adding a tag for the object according to information inputted by a user.

In an example, the association module 605 is further capable of determining a pixel location of each of the one or more tags in the photographic image and associating the determined pixel location of each of the one or more tags with the image identifier and the user identifier.

In an example, the terminal device 600 further includes an upload module 609 capable of uploading to a server a user identifier of a current user, the image identifier and the one or more tags, and further includes a request module 610 capable of sending to the server an opening request including the user identifier and the image identifier; receiving from the server the photographic image which is determined by the server according to the image identifier as well as each tag which is determined by the server according to the user identifier and the image identifier. The presenting module 603 is capable of presenting the received photographic image, and presenting each received tag on the photographic image in response to a user instruction for presenting tags.

In an example, the request module 610 is further capable of sending to the server a browse request including the user identifier, and receiving from the server a set of tags associated with the user identifier and a set of thumbnail images of photographic images associated with the user identifier. The presenting module 603 is capable of presenting the set of tags and the set of thumbnail images, and in response to a user instruction of selecting any of the set of tags, presenting one or more thumbnail images of one or more photographic images associated with the selected tag. The request module 610 is further capable of in response to a user instruction of selecting any of the presented one or more thumbnail images, sending to the server an opening request including an image identifier of the selected thumbnail image, and receiving from the server the photographic image which is determined by the server according to the image identifier. The presenting module 603 is capable of presenting the received photographic image.

In an example, the terminal device 600 shown in FIG. 6 may include a memory 61 and a processor 62, the memory 61 stores instructions executable for the processor 62. Any or any combination of the modules 601~610 may be set(s) of instructions. The memory 61 may include any of any combination of the modules 601~610, and through executing the instructions read from any of any combination of the modules 601~610, the processor 62 can accomplish the functions of any of any combination of the modules 601~610 as mentioned above. Therefore, the present disclosure provides a terminal device in a VR system, including the processor 62, the memory 61, and instructions stored in the memory and executable by the processor, where the instructions include any of any combination of the modules 601~610.

Figure 7:
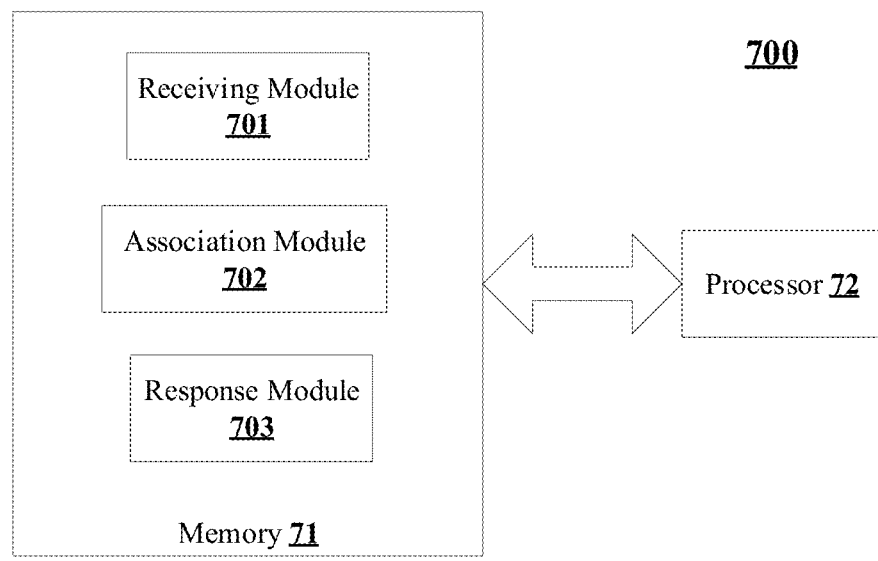
FIG. 7 is an illustrative diagram showing a server device provided in an example of the present disclosure.

Based on the above examples, the present disclosure further provides a server device in the VR system. As shown in FIG. 7, the server device 700 includes a VR server which includes the following modules:

Receiving module 701 capable of receiving from a client a user identifier, an image identifier of a photographic image, and one or more tags; wherein the client analyzes the photographic image through an image recognition algorithm to identify at least one object in the photographic image and generate at least one tag respectively corresponding to the at least one object, and confirms the one or more tags from the at least one tag;

Association module 702 capable of associating the image identifier with the user identifier to associate the photographic image with the user identifier; and associating the one or more tags with the image identifier and the user identifier;

Response module 703 capable of in response to receiving from the client an opening request including the user identifier and the image identifier, determining the photographic image according to the image identifier, and sending the determined photographic image to the client.

In an example, the response module 703 is further capable of in response to receiving from the client the opening request, determining the one or more tags associated with the user identifier and the image identifier, and sending the one or more tags to the client.

In an example, the receiving module 701 is further capable of receiving a pixel location of each of the one or more tags from the client. The association module 702 is further capable of associating the pixel location of each of the one or more tags with the user identifier and the image identifier. The response module 703 is further capable of in response to receiving the opening request, determining the pixel location of each of the one or more tags, and sending the determined pixel location of each of the one or more tags to the client.

In an example, the response module 703 is further capable of:
  receiving from the client a browse request including the user identifier;
  sending to the client a set of tags associated with the user identifier and a set of thumbnail images of photographic images associated with the user identifier;
  receiving from the client an opening request including an image identifier of a thumbnail image selected by a user and the user identifier, determining the photographic image according to the image identifier of the thumbnail image; and
  sending to the client the determined photographic image.

In an example, the server device 700 shown in FIG. 7 may include a memory 71 and a processor 72, the memory 71 stores instructions executable for the processor 72. Any or any combination of the modules 701~703 may be set(s) of instructions. The memory 71 may include any of any combination of the modules 701~703, and through executing the instructions read from any of any combination of the modules 701~703, the processor 72 can accomplish the functions of any of any combination of the modules 701~703 as mentioned above. Therefore, the present disclosure provides a server device in a VR system, including the processor 72, the memory 71, and instructions stored in the memory and executable by the processor, where the instructions include any of any combination of the modules 701~703.

The above modules can implement various examples mentioned before based on the same/similar principle, and the specific descriptions of the examples will not be discussed in this paper.

Furthermore, the examples of the present disclosure can be applied to various terminal/server devices and can be used cross platforms and across devices, which have a wide application range.

The system, devices, clients, servers and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

A machine-readable storage medium is also provided, which is to store instructions to cause a machine such as the computing device to execute one or more methods as described herein. Specifically, a system or apparatus having a storage medium that stores machine-readable program codes for implementing functions of any of the above examples and that may make the system or the apparatus (or CPU or MPU) read and execute the program codes stored in the storage medium.

The present disclosure also provides a non-transitory machine-readable storage medium, storing instructions to cause a machine to execute the method of any of the above examples.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer (namely a computing device), at least part of the operations performed by the program codes may be implemented by an operation system running in a computer following instructions based on the program codes to realize a technical scheme of any of the above examples.

In addition, the program codes implemented from a storage medium are written in storage in an extension board inserted in the computer or in storage in an extension unit connected to the computer. In this example, a CPU in the extension board or the extension unit executes at least part of the operations according to the instructions based on the program codes to realize a technical scheme of any of the above examples.

The foregoing description, for the purposes of explanation, has been described with the reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications which are suited to the particular use contemplated.

What is claimed is:

1. A method of image processing in a Virtual Reality (VR) system implemented by a computing device, comprising:
  obtaining a photographic image;
  identifying at least one object in the photographic image;
  generating at least one tag respectively for each of the at least one object;
  automatically determining a first pixel location of each of the at least one tag in the photographic image;
  presenting the at least one tag of the photographic image through a VR User Interface (UI), wherein the at least one tag is presented at the corresponding first pixel location on the photographic image through the VR UI;
  receiving, from a VR controller operably connected to the computing device, a confirmation user instruction when the VR controller detects a pointing operation at a tag of the at least one tag or an object corresponding to the tag displayed on the photographic image in the VR UI, the photographic image being a 3-dimension photo, a 360-degree photo, or a 720-degree photo;
  determining a pixel location where the confirmation user instruction is pointing on the photographic image in response to receiving the confirmation user instruction, and taking the pointed pixel location as a second pixel location of the tag;
  confirming one or more of the at least one tag in response to receiving one or more of the confirmation user instruction from the VR UI; and
  associating the confirmed one or more tags and the second pixel location of each of the one or more tags with the photographic image.

2. The method of claim 1, before identifying the at least one object in the photographic image, further comprising:
presenting the photographic image with a UI control for activating a tag service through the VR UI; and
activating the tag service in response to the VR controller receiving an activation user instruction on the UI control;
wherein the identifying the at least one object is performed upon the tag service being activated.

3. The method of claim 1, further comprising:
respectively determining the pixel location of each of the at least one tag according to a pixel location of the corresponding at least one object.

4. The method of claim 1, wherein confirming the one or more of the at least one tag comprises:
in response to receiving a first user instruction to one of the at least one tag, confirming the one of the at least one tag.

5. The method of claim 1, further comprising:
in response to receiving a tagging user instruction to one of the at least one object, adding a tag for the one of the at least one object according to information inputted by a user.

6. The method of claim 5, wherein adding the tag for the one of the at least one object comprises:
recording voice data inputted by the user;
generating the tag comprising the recorded voice data for the one object; and
presenting the generated tag on the photographic image.

7. The method of claim 1, wherein associating the confirmed one or more tags with the photographic image comprises:
associating the confirmed one or more tags with an image identifier of the photographic image and a user identifier of a current user.

8. The method of claim 7, further comprising:
associating the second pixel location of each of the one or more tags with the image identifier and the user identifier.

9. The method of claim 1, further comprising:
uploading to a server a user identifier of a current user, the image identifier, and the one or more tags.

10. The method of claim 9, further comprising:
after associating the confirmed one or more tags with the photographic image and uploading the user identifier, the image identifier, and the one or more tags, sending to the server an opening request comprising the user identifier and the image identifier;
receiving, from the server, the photographic image which is determined by the server according to the image identifier, and each tag which is determined by the server according to the user identifier and the image identifier; and
presenting the received photographic image; and
in response to a display user instruction for presenting tags, presenting each received tag on the photographic image.

11. The method of claim 9, further comprising:
sending to the server a browse request comprising the user identifier;
receiving from the server a set of tags associated with the user identifier and a set of thumbnail images of photographic images associated with the user identifier;
presenting the set of tags and the set of thumbnail images;
in response to a user instruction of selecting any of the set of tags, presenting one or more thumbnail images of one or more photographic images associated with the selected tag;
in response to a user instruction of selecting any of the presented one or more thumbnail images, sending to the server an opening request comprising an image identifier of the selected thumbnail image;
receiving from the server the photographic image which is determined by the server according to the image identifier; and
presenting the received photographic image.

12. A terminal device in a Virtual Reality (VR) system, comprising:
a processor;
a memory; and
instructions stored in the memory and executable by the processor;
wherein when executing the instructions, cause the processor to perform:
obtaining a photographic image;
identifying at least one object in the photographic image;
generating at least one tag respectively for each of the at least one object;
automatically determining a first pixel location of each of the at least one tag in the photographic image;
presenting the at least one tag of the photographic image through a VR User Interface (UI), wherein the at least one tag is presented at the corresponding first pixel location on the photographic image through the VR UI;
receiving, from a VR controller operably connected to the terminal device, a confirmation user instruction when the VR controller detects a pointing operation at a tag of the at least one tag or an object corresponding to the tag in the VR UI, the photographic image being a 3-dimension photo, a 360-degree photo, or a 720-degree photo;
in response to receiving the confirmation user instruction, determining a pixel location where the confirmation user instruction is pointing on the photographic image, and taking the pointed pixel location as a second pixel location of the tag;
confirming one or more of the at least one tag in response to receiving one or more of the confirmation user instruction from the VR UI; and
associating the confirmed one or more tags and the second pixel location of each of the one or more tags with the photographic image.

13. The terminal device of claim 12, before identifying the at least one object in, the processor is further configured to perform:
presenting the photographic image with a UI control for activating a tag service through the VR UI; and
activating the tag service in response to the VR controller receiving an activation user instruction on the UI control;
wherein the identifying the at least one object is performed upon the tag service being activated.

14. The terminal device of claim 12, wherein the processor is further configured to perform:
in response to receiving a tagging user instruction to one of the at least one object, adding a tag for the one of the at least one object according to information inputted by a user.

15. The terminal device of claim 12, wherein the processor is further configured to perform:
uploading to a server a user identifier of a current user, the image identifier, and the one or more tags.

16. The terminal device of claim 15, wherein the processor is further configured to perform:
sending to the server an opening request comprising the user identifier and the image identifier;
receiving from the server the photographic image which is determined by the server according to the image identifier as well as each tag which is determined by the server according to the user identifier and the image identifier; and
presenting the received photographic image; and
in response to a display user instruction for presenting tags, presenting each received tag on the photographic image.

17. The terminal device of claim 15, wherein the processor is further configured to perform:
sending to the server a browse request comprising the user identifier;
receiving from the server a set of tags associated with the user identifier and a set of thumbnail images of photographic images associated with the user identifier;
presenting the set of tags and the set of thumbnail images;
in response to a user instruction of selecting any of the set of tags, presenting one or more thumbnail images of one or more photographic images associated with the selected tag;
in response to a user instruction of selecting any of the presented one or more thumbnail images, sending to the server an opening request comprising an image identifier of the selected thumbnail image;
receiving from the server the photographic image which is determined by the server according to the image identifier; and
presenting the received photographic image.

18. A non-transitory machine-readable storage medium, storing computer program instructions executable by at least one processor of a terminal device to perform:
obtaining a photographic image;
identifying at least one object in the photographic image;
generating at least one tag respectively for each of the at least one object;
automatically determining a first pixel location of each of the at least one tag in the photographic image;
presenting the at least one tag of the photographic image through a VR User Interface (UI), wherein the at least one tag is presented at the corresponding first pixel location on the photographic image through the VR UI;
receiving, from a VR controller operably connected to the terminal device, a confirmation user instruction when the VR controller detects a pointing operation at a tag of the at least one tag or an object corresponding to the tag in the VR UI, the photographic image being a 3-dimension photo, a 360-degree photo, or a 720-degree photo;
in response to receiving the confirmation user instruction, determining a pixel location where the confirmation user instruction is pointing on the photographic image, and taking the pointed pixel location as a second pixel location of the tag;
confirming one or more of the at least one tag in response to receiving the confirmation user instruction from the VR UI; and
associating the confirmed one or more tags and the second pixel location of each of the one or more tags with the photographic image.

* * * * *